March 13, 1928.

C. L. MICHOD

VEHICLE STAY BLOCK

Filed April 18, 1925

1,662,159

Inventor:
Charles L. Michod
By
Ernest E. Tupes
Atty.

Patented Mar. 13, 1928.

1,662,159

UNITED STATES PATENT OFFICE.

CHARLES L. MICHOD, OF CHICAGO, ILLINOIS, ASSIGNOR TO E. S. EVANS & CO., INC., OF DETROIT, MICHIGAN, A CORPORATION OF DELAWARE.

VEHICLE STAY BLOCK.

Application filed April 18, 1925. Serial No. 24,019.

My invention relates to stay blocks for vehicles and more particularly to blocks which are adapted to be fastened to the floor of a railway car or to the floor of a boat in which the vehicles are being shipped, with the blocks positioned and constructed so that they bear against the tire of said vehicles to prevent movement of the vehicles relative to the floor.

This invention is an improvement in and modification of the invention disclosed in my co-pending application, Serial No. 691,339, filed February 8, 1925.

One of the objects of the invention is to provide a block for the purpose described which can be economically constructed by stamping from a single piece of sheet metal and reinforcing the portion of the block which is subjected to compression with timber or other relatively cheap and light material which is strong in compression.

Another object of the invention is to provide blocks for the purpose described which are relatively light in weight so as to minimize the outgoing freight charges due to their weight and which are adapted for nesting for return shipment with the resulting saving in expense for return charges and also for economy in storage space.

These and other objects will be more fully set forth and described in the following specification and shown in the accompanying drawings, in which.

Figure 1:
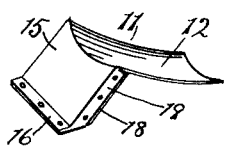
Fig. 1 is a perspective view of the preferred embodiment of the invention.
Figure 2:
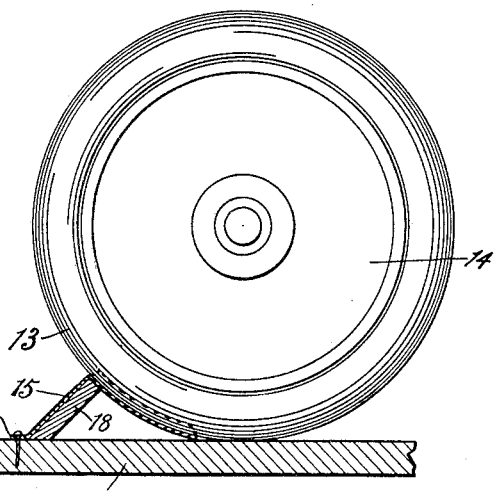
Fig. 2 is a longitudinal sectional view through the preferred embodiment of the invention showing the same fastened to the floor of a car in operative position against a wheel.

The preferred embodiment of the invention comprises a member generally designated by the numeral 11 and preferably integrally formed from sheet metal by stamping. The member 11 has an oblong portion 12, concave transversely and longitudinally to fit a tire 13, forming part of the vehicle wheel 14, and a downwardly extending front portion 15 which preferably joins the portion 14 at an angle of substantially ninety degrees along a line, which, if projected, passes approximately through the axis of the wheel or tire engaged by the portion 12. An apertured flange 16 is provided for fastening the device to a floor 17 by nails, as indicated in Fig. 2. The front portion 15 of the device is subjected to compressive stresses and a reinforcing block 18, preferably of wood or some other relatively light material which is strong in compression, is provided to take the compressive stresses. The block 18 is fastened to the front portion 15 by nails or screws extending through side flanges 19 forming part of the front portion 15.

The transversely and longitudinally concaved construction of the oblong portion 15 is adapted to fit the tire 13 and prevent any movement of the wheel transversely. By providing a block for the outer ends of each of the four wheels of an automobile longitudinal movement is likewise prevented. The smooth surface of the block and the fixed position of the wheels is adapted to avoid any marring of the tires by friction with the block. The cross section of the portion 15 being concave offers greater resistance to flexural or bending stresses than if its cross section were rectangular and thereby enables a thinner plate to be used in this portion to resist the tendency of the wheel to ride thereover when in transit. The use of the reinforcing block 18 gives the requisite strength in compression to the front portion of the device and permits the entire metallic portion to be integrally formed by stamping from a single piece of sheet metal.

The completed blocks 11 are adapted for nesting for reshipment either with or without the reinforcing blocks 18. This results in a substantial saving of space for storage purposes as well as a saving in return freight charges.

Figures 4, 5:
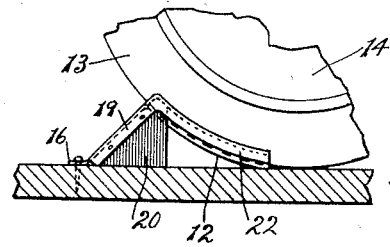
Fig. 4 is an elevational view of the device shown in Fig. 3, in operative position against a wheel.
Fig. 5 is an end view of the device shown in Fig. 3.
Figure 3:
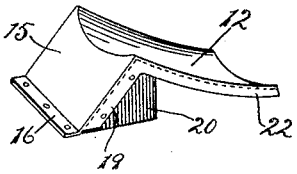
Fig. 3 is a perspective view of an alternative embodiment of the invention.
Figure 6:
Fig. 6 is a perspective view of a block forming part of the alternative embodiment shown in Fig. 3.

In the alternative embodiment of the invention, as disclosed in Figs. 3 to 6 inclusive, provision is made for the block to take relatively greater compressive stresses than in the preferred embodiment. This is accomplished by increasing the size and the weight of the reinforcing block 20 over the corresponding block 18 in the preferred embodiment and by providing the oblong portion 21 with substantially vertical flanges 22. The front portion 15 of the alternative embodiment and its flanges 16 and 19 are similar to the corresponding members of the preferred embodiment except that the flanges 19 are slightly flared outwardly. The outward flares of the flanges 19 and 22 are slight, and as indicated in Fig. 5, this flare or taper being provided only to permit the nesting or packing of the blocks advantageously. If it is desired to ship the devices of the alternative embodiment back to the factory and it is considered undesirable to return the relatively heavy reinforcing blocks 20, the latter can be removed and the integrally formed metallic portions can, by reason of the tapered flanges 19 and 22, be closely nested and packed. The alternative embodiment is particularly adapted for use in the shipment of heavy vehicles which require blocks capable of resisting heavy thrusts while in transit.

Thus it will be seen that I have provided a block for the purpose described which can be economically constructed by stamping, or the like, from sheet metal, and the provision of a removable reinforcing portion of relatively light and compressive resisting material which can be returned to the factory compactly packed and nested whereby the economies of manufacture are augmented by the savings incidental to reshipment and repeated use of the same block.

I claim:

In a device of the class described, a triangular shaped member comprising a wheel engaging leg of arcuate contour and transversely concaved cross section, a strut integrally formed with said leg and extending from the apex to a support along a line passing substantially through the axis of a wheel engaged by said leg, and a removable reinforcing member in the space between said leg, support and strut, said leg and strut having downwardly extending, outwardly flaring flanges on their lateral edges.

Signed at Chicago, Illinois, this 13th day of April, 1925.

CHARLES L. MICHOD.